US009610663B1

(12) United States Patent
Goldberg (10) Patent No.: US 9,610,663 B1
(45) Date of Patent: Apr. 4, 2017

(54) ALIGNMENT FIXTURE FOR FACILITATING ELECTRICAL OR MECHANICAL CONNECTION

(71) Applicant: Nicholas S. Goldberg, Perris, CA (US)

(72) Inventor: Nicholas S. Goldberg, Perris, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 202 days.

(21) Appl. No.: 14/531,040

(22) Filed: Nov. 3, 2014

Related U.S. Application Data

(60) Provisional application No. 62/019,200, filed on Jun. 30, 2014.

(51) Int. Cl.
*G01B 5/25* (2006.01)
*B23P 19/10* (2006.01)
*H01R 13/629* (2006.01)
*H01R 43/26* (2006.01)
*B23P 19/04* (2006.01)

(52) U.S. Cl.
CPC .............. *B23P 19/10* (2013.01); *B23P 19/04* (2013.01); *H01R 13/629* (2013.01); *H01R 43/26* (2013.01)

(58) Field of Classification Search
CPC .. G01B 5/24; G01B 5/25; B23P 19/10; H01R 13/629
USPC .......... 33/645, 412, 712, 533, 613, 549, 555
See application file for complete search history.

(56) References Cited

U.S. PATENT DOCUMENTS

| | | | |
|---|---|---|---|
| 2,791,033 A | 5/1957 | Walters | |
| 3,072,021 A | 1/1963 | Marcon | |
| 3,174,006 A | 3/1965 | Haake | |
| 3,193,790 A | 7/1965 | Boyle et al. | |
| 3,245,319 A | 4/1966 | Kossan et al. | |
| 3,724,322 A | 4/1973 | Reed | |
| 3,883,209 A | 5/1975 | Kongelbeck | |
| 4,031,806 A | 6/1977 | Stark et al. | |
| 4,161,068 A * | 7/1979 | McMaster | G01B 11/27 33/412 |
| 4,390,222 A | 6/1983 | Carter | |

(Continued)

OTHER PUBLICATIONS

Miodrag Kobilarev, "Choice and Analysis of the Launcher Interface Optimal Solution for an Anti-Tank Guided Missile," Scientific-Technical Review, vol. L.V., No. 2, pp. 64-68, 2005.

*Primary Examiner* — Christopher Fulton
(74) *Attorney, Agent, or Firm* — Howard Kaiser (57) ABSTRACT

According to exemplary inventive practice, a frame has a geometric vertical axial plane and supports a receptacle, four thumbscrews, and four dial indicators. Each thumbscrew has a dial indicator associated therewith and can be turned to move along its geometric axis, perpendicular to the vertical axial plane. The thumbscrews are paired, with respective axes aligned, on opposite sides of the vertical axial plane. The frame is placed upon a base, the body is secured to the frame using the receptacle to grip a portion of the body, and the dial indicators are calibrated for matching thumbscrew displacement measurements in each opposite thumbscrew pair. The thumbscrews are moved into contact with the base and are adjusted to align the body with the base, as indicated by matching dial indicator readings in each opposite thumbscrew pair. The aligned body is affixed to the base, and the frame (with accompanying components) is removed.

12 Claims, 6 Drawing Sheets

(56) References Cited

U.S. PATENT DOCUMENTS

| | | | |
|---|---|---|---|
| 4,534,114 A * | 8/1985 | Woyton | G01B 5/25 33/645 |
| 4,578,869 A * | 4/1986 | O'Brien | G01B 5/25 33/533 |
| 4,581,977 A | 4/1986 | Ross et al. | |
| 4,976,399 A | 12/1990 | Bay et al. | |
| 5,185,937 A * | 2/1993 | Piety | G01B 5/25 33/412 |
| 5,206,980 A * | 5/1993 | Chapman | B23P 19/10 254/29 R |
| 5,371,953 A * | 12/1994 | Nower | G01B 5/25 33/412 |
| 5,896,672 A * | 4/1999 | Harris | G01B 5/25 33/286 |
| 6,379,071 B1 | 4/2002 | Sorvino | |
| 6,427,353 B1 * | 8/2002 | Nelson | G01B 5/00 33/542 |
| 6,449,868 B1 * | 9/2002 | Kumagae | G01B 5/146 33/548 |
| 6,470,587 B1 * | 10/2002 | Cunningham | G01B 5/0025 33/549 |
| 7,430,812 B2 * | 10/2008 | Hiebert | G01B 5/24 33/529 |
| 8,439,301 B1 | 5/2013 | Lussier et al. | |
| 2008/0124961 A1 | 5/2008 | Cronin | |
| 2015/0343611 A1 * | 12/2015 | Buckminster | B23Q 3/104 29/890.06 |
| 2016/0363432 A1 * | 12/2016 | Andersson | G01B 5/25 |

\* cited by examiner

ALIGNMENT FIXTURE FOR FACILITATING ELECTRICAL OR MECHANICAL CONNECTION

CROSS-REFERENCE TO RELATED APPLICATION

This application claims the benefit of U.S. provisional application Ser. No. 62/019,200, incorporated herein by reference, filing date 30 Jun. 2014, title "Alignment Fixture for Facilitating Electrical or Mechanical Connection," inventor Nicholas S. Goldberg.

BACKGROUND OF THE INVENTION

The present invention relates to linear measurement (e.g., of distance, size, or dimensions), more particularly to methods and apparatuses that perform linear measurement for aligning interconnecting mechanical or electromechanical components.

Many electromechanical applications involve use of electrical connectors that provide automatic engagement upon mating of two interfacing components. In the aerospace industry, an electrical connector of this kind is sometimes referred to as an "umbilical connector" or an "automate connector." Depending on factors such as size, type, purpose, and position of the connector, high or exact positional accuracy of the connector may be required. It may be difficult to achieve highly accurate positioning because the automatic engagement takes place in an enclosed area, thus prohibiting visual confirmation of engagement.

Therefore, there is need for a practical tool that properly aligns a connector with a recipient of the connection. In particular, it is desirable to implement an alignment device of this kind that not only increases accuracy but also reduces assembly time of a system, resulting in greater operational capability of the system.

SUMMARY OF THE INVENTION

According to exemplary practice the present invention, a method or apparatus is provided for achieving a true and precise position of a connector element with respect to a "connectee" element. The present invention can be embodied as an alignment instrumentality, or as a method that implements the inventive alignment instrumentality. According to many inventive embodiments, inventive practice serves to improve interfacing between systems, or between electromechanical parts or components of such systems. Another possible benefit of inventive practice is to ensure that particular hardware is built to specifications, such as those detailed in design and drawing packages.

Exemplary inventive practice provides a method for alignedly positioning a first object upon a second object. According to an exemplary inventive method, a frame is situated on the second object. The first object is placed on the second object so that the first object is held by an alignment element that is coupled with the frame. While the alignment element holds the first object, four screws that are supported by the frame are each displaced so as to contact the second object. The respective displacements of the screws are measured, and the screws are adjusted, until the displacement measurements are equal in each coaxial pair of screws. Thus aligned with respect to the second object, the first object is affixed to the second object. The frame, along with its associated elements, is disengaged from the first and second objects.

An exemplary inventive apparatus includes a frame, four thumbscrews, an alignment receptacle, and four displacement measurement devices. The frame is mounted on a base entity and is characterized by a geometric vertical axial plane. The thumbscrews, alignment receptacle, and displacement measurement devices are supported by the frame. Each thumbscrew is characterized by a geometric screw axis and is adjustably displaceable along its geometric screw axis, which is perpendicular to the geometric vertical axial plane. The thumbscrews are arranged in coaxial pairs on opposite sides of the geometric vertical axial plane. The displacement measurement devices measure the respective displacements of the thumbscrews while the thumbscrew tips each contact the base entity, and while a to-be-positioned entity sits on the base entity and is held by the alignment receptacle. Before the displacement measurements are taken, the displacement measurement devices are calibrated for correspondence in each coaxial pair of thumbscrews. According to some inventive embodiments, the alignment receptacle can mechanically protract and recede from the frame, such capability facilitating embrace of the to-be-positioned entity by the alignment receptacle.

The inventive methodology can be practiced, for instance, to align an electrical connector (e.g., an electrical plug) so that it will be positioned to properly mate with an electrical connectee (e.g., an electrical receptacle). An example of an electrical connector is an "umbilical" connector such as used in certain military applications.

Inventive practice does not directly align a connector element with respect to a connectee element; rather, inventive practice indirectly aligns a connector element with respect to a connectee element. That is, an inventive alignment fixture having an aligner element is implemented so as to alignedly position the connector element for prospective coupling with a connectee element. According to exemplary inventive practice, the aligner element is approximately a hollow cylinder in shape and essentially an envelope in function.

In some applications, the traditional approach to positioning an electrical connector requires the application of standard measuring inspection (SMI) techniques, applied both before and after the position of the connector is established. This may prove time-consuming, and in some cases ineffective, in establishing the true position of the connector. Through exemplary practice of the present invention, the proper position of a connective member can be established quickly and precisely. Moreover, the present invention can often be practiced with minimal training for the practitioner.

The instant disclosure includes exemplary description involving a type of guided missile. The ordinarily skilled artisan who reads this disclosure will understand that inventive principles can be applied to varieties of applications and configurations requiring the proper positioning of a mechanical and/or electrical (e.g., electromechanical) connective member. For instance, inventive practice is possible whether the loading condition is automated, semi-automated, or manual. Furthermore, the present invention's alignment fixture can be used to properly position a connective member regardless of whether or not the connective member has umbilical features.

As more detailedly described hereinbelow, exemplary inventive practice includes basically the following operations: Four dial indicators are centered using a dial indicator master. The inventive fixture is slid onto retainer flanges. The aligner element (connector envelope) is slid onto and at least partially covers the connector element. Alignment screws are adjusted until the two front dial indicators read the same, and the two back dial indicators read the same. The position of the connector housing (e.g., umbilical cover) is adjusted to comport with the position of the connector element. The connector housing is fastened in place. The retainer flange lock assembly is tightened. The inventive fixture is removed.

According to frequently preferred inventive practice, the aligner element is caused to capture the connector element prior to the adjustment of the alignment screws. Nevertheless, the connector element and the connector housing may be related or configured such that an order of inventive operation is favorable whereby the aligner element is caused to capture the connector element subsequent to the adjustment of the alignment screws.

BRIEF DESCRIPTION OF THE DRAWINGS

The present invention will now be described, by way of example, with reference to the accompanying drawings, wherein:

FIG. 4 illustrates, inter alia, the clamping assembly and the sliding pin assembly.

FIG. 5 shows a mode of inventive practice whereby the aligner element is fixed with respect to the alignment fixture; the alignment fixture is moved axially to couple with or uncouple from the connector element. FIG. 6 shows a mode of inventive practice whereby the aligner element is axially movable with respect to the alignment fixture; the aligner element is moved axially to couple with or uncouple from the connector element.

DESCRIPTION OF EXEMPLARY EMBODIMENTS OF THE INVENTION

With reference to the figures, the present invention's alignment fixture 100 includes a fixture frame 11, a connector alignment element 12, shoe retainer flange clamps 13, clamping assembly 14, aft thumbscrews 15 (i.e., 15a and 15b), aft dial indicators 16 (i.e., 16a and 16b), forward thumbscrews 17 (17a and 17b), forward dial indicators 18 (18a and 18b), and sliding-envelope assembly 19. The two aft thumbscrews 15 and the two forward thumbscrews 17 each have a thumbscrew tip 57. Each of the four thumbscrews is characterized by a geometric longitudinal thumbscrew axis t, and can be turned in either circumferential direction to be correspondingly displaced in either linear direction along thumbscrew axis t.

Alignment fixture 100, in particular its frame 11, is characterized by a geometric axial-longitudinal fixture plane a. Aligner element 12 is geometrically bisected by axial-longitudinal plane a. Connector unit 200 includes a connector housing 21 and a connector element 22. Aligner element 12 is attached to alignment fixture 100's frame 11, which is capable of situation upon a base component 300. Fixture frame 11 serves to confine connector housing 21 while both frame 11 and connector unit 200 are situate upon base component 300; more specifically, aligner element serves to capture connector element 22 while both frame 11 and connector unit 200 are situate upon base component 300.

Calibration

Figures 1, 2:
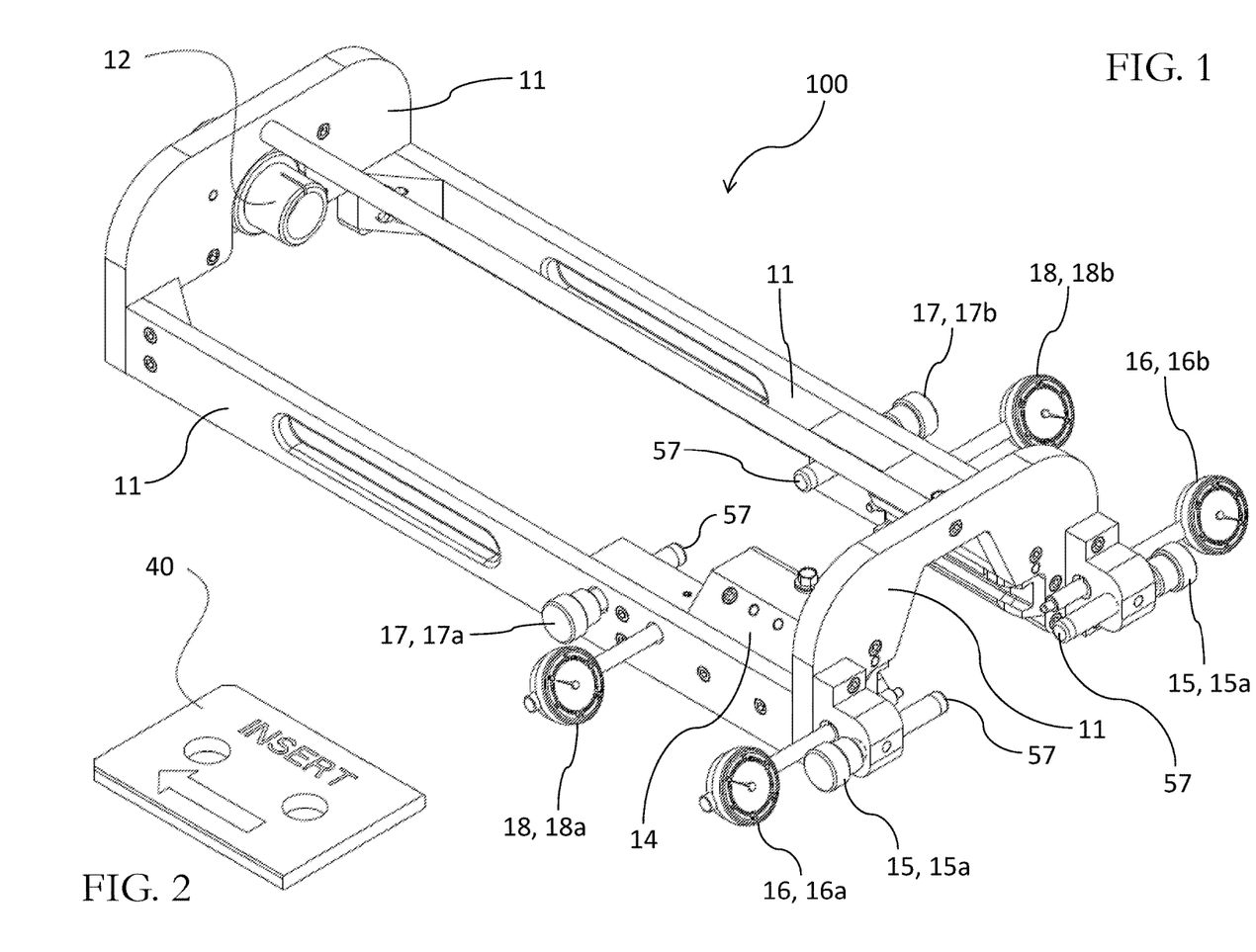
FIG. 1 is a perspective view of an example of an alignment fixture in accordance with the present invention.
FIG. 2 is a perspective view of an example of a set master suitable for use in association with the inventive alignment fixture shown in FIG. 1.
Figure 3:
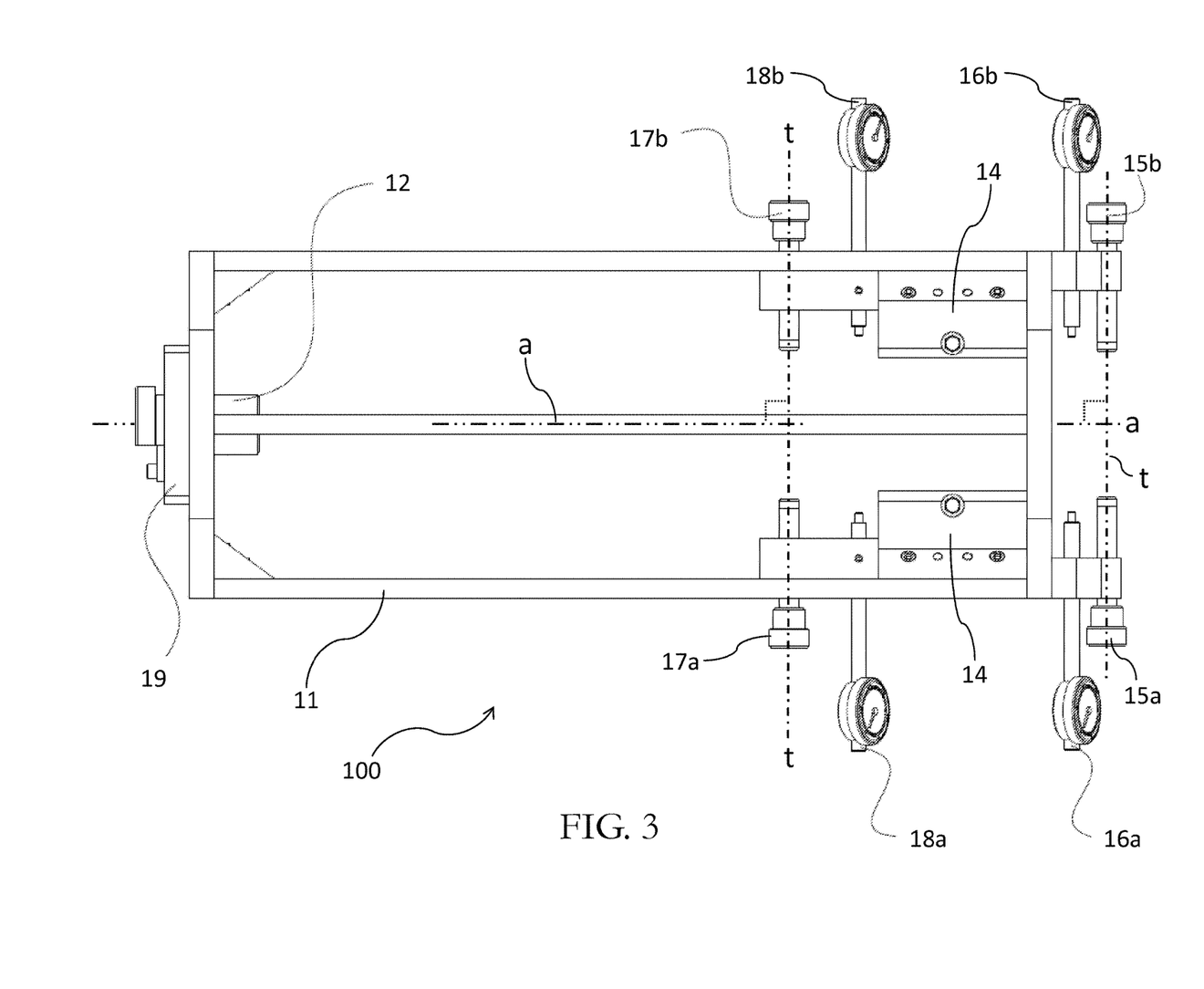
FIG. 3 is a top plan view of the inventive alignment fixture shown in FIG. 1.
Figure 4:
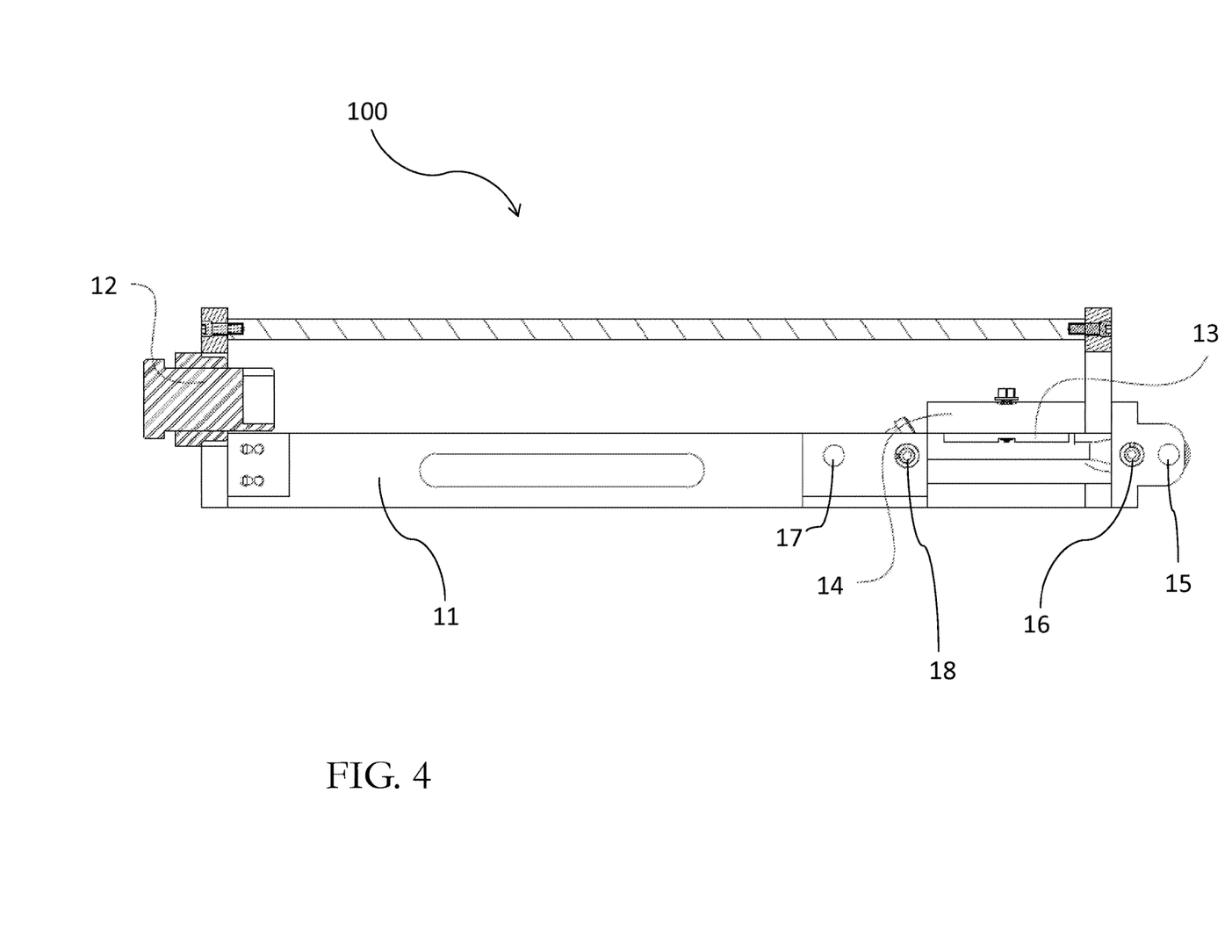
FIG. 4 is a sectional side (axial-longitudinal) elevation view of the inventive alignment fixture shown in FIGS. 1 and 3.

Using an external physical calibration device such as set master 40 shown in FIG. 2, a uniform value of zero is set with reference to the vertical geometric plane in which lies longitudinal axis a. Generally speaking, a set master is a physical piece of calibrated hardware providing a known dimensional or locational value that can then be related to measuring equipment for purposes of calibrating the measuring equipment.

With the use of set master 40, a value of zero (e.g., zero inches, or zero millimeters, or zero centimeters) is calculated and set for each corresponding pair of dial indicators. The forward pair of dial indicators are dial indicators 18a and 18b; the aft pair of dial indicators are dial indicators 16a and 16b. Forward dial indicators 18a and 18b are located on perpendicularly opposite sides of the vertical geometric plane of longitudinal axis a; similarly, aft dial indicators 16a and 16b are located on perpendicularly opposite sides of the vertical geometric plane of longitudinal axis a.

Set master 40 is employed to ensure proper centering of the forward aft indicators 18 and the aft dial indicators 16. Manufacture of set master is to a slip fit condition with respect to alignment fixture 100's shoe retainers 13. Upon placing set master 40 into shoe retainers 13, the four dial indicators 18 and 16 should read the same value.

If all four dial indicators do not read the same value when using set master 40, this indicates that the dial indicators are not properly positioned about the medial geometric plane of alignment fixture 100, i.e., the vertical geometric plane a, in which lies the longitudinal axis of frame 11. Failure to achieve equal values among the four dial indicators suggests that the secondary datum cannot be properly established.

Thumbscrews and retainer flange clamps are retracted on alignment fixture 100. Set master 40 is inserted into alignment fixture 100 until set master 40 has made full contact with the fixture shoes and dial indicators 16 and 18. In order to prevent damage to the dial indicators, care should be taken to make certain that the dial indicator tips slide onto the set master and do not catch. The set master calibration is successful only if all four of the dial indicators 16 and 18 read zero, whereupon the set master 40 may be removed from the alignment fixture 100.

According to some inventive embodiments, if the dial indicators do not read zero, they may be adjusted to zero using a dial indicator lock knob. The dial indicator knob may be loosened and a bezel rotated to set the dial indicator needle to zero. The dial indicator lock knob is retightened once the dial indicator needle is at the zero location. This procedure should only be performed if no lateral play exists between the set master and the fixture shoes, and if the deviation from zero is very slight, e.g., less than 0.010.

Adjustment of the dial indicators using a set master is an option that need not be availed of in inventive practice; some inventive embodiments utilize a set master, and some inventive embodiments do not. In any event, if calibration using a set master 40 is performed, it should precede operation of alignment fixture 100 with respect to connector unit 200 and base component 300.

Operation

Figure 7:
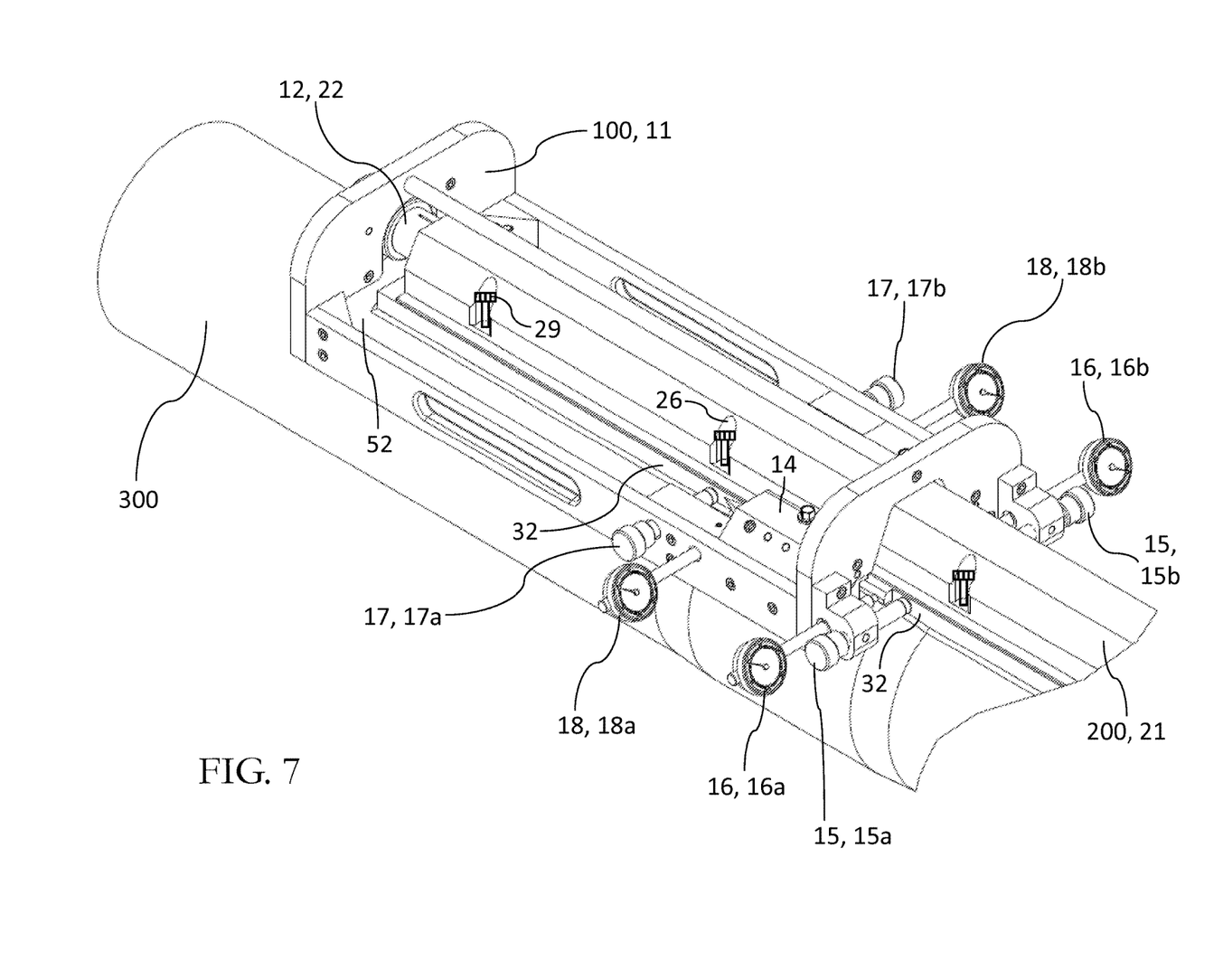
FIG. 7 is a perspective view of the inventive alignment fixture shown in FIGS. 1, 3, and 4, and of a component on which the inventive alignment fixture is mounted.

Before associating alignment fixture 100 with connector unit 200, the connector housing 21 of connector unit 200 should be loosely mounted upon base component 300. For instance, fasteners 29 such as screws (e.g., 10X screws) can be used to slackly adjoin connector housing 21 (e.g., an umbilical cover) atop base component 300 (e.g., a strongback) to remain in place, doing so without tightening the screws and thereby permitting connector housing 21 to move freely. As shown in FIG. 7, fasteners 29 are accommodated by recesses 26 in connector housing 21.

Exemplary inventive practice seeks to align connector element 22 with respect to a contemplated connectee element (not shown in the figures) that is to be associated with base component 300 so as to have a precise pre-established location relative to base component 300. Before the inventive alignment measures are performed, alignment fixture 100 should be appropriately positioned on the base component 300 so as to "capture" (e.g., surround or contain) a portion of the connector unit 200, and be positioned for adjustment of dial indicators 16 and 18 with respect to two opposite side walls 32 of base component 300.

Figure 8:
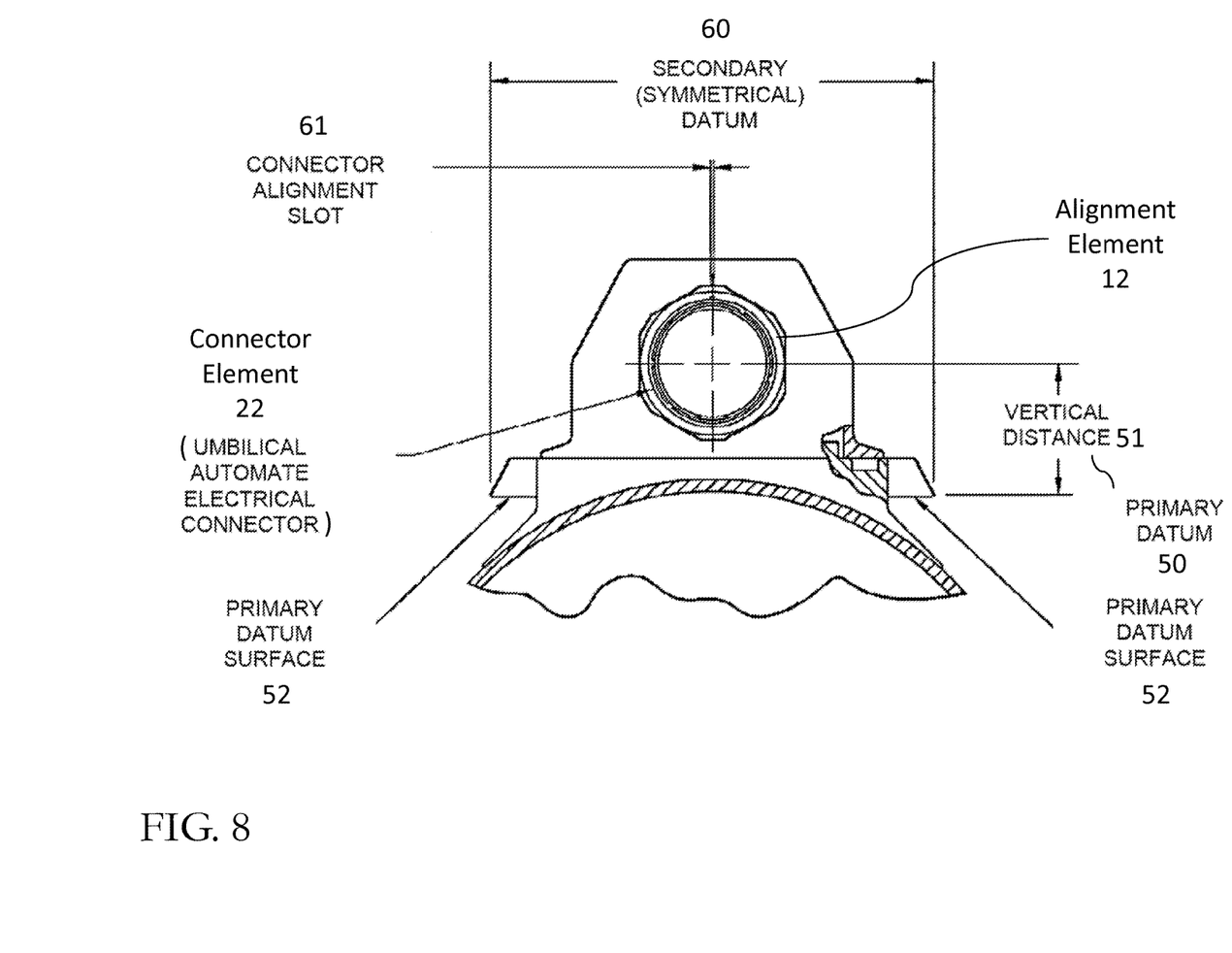
FIG. 8 is a diagram illustrating an example of geometric criteria for inventively performing alignment of a connector element. A vertical distance datum (also referred to herein as the "primary" datum) and a transverse horizontal symmetry datum (also referred to herein as the "secondary" datum) are used align the connector element.

Particularly with reference to FIG. 8, according to exemplary inventive practice, the alignment is performed by locating connector element 22 in consideration of two datums (reference planes), while connector element 22 is mated with aligner element 12, viz., a primary datum and a secondary datum.

The first datum, primary datum 50, pertains to the vertical position (elevation or height) of connector element 22 in the above-noted vertical axial-longitudinal geometric plane, i.e., the vertical geometric plane in which lies longitudinal axis a. The vertical position of connector element 22 may be determined, for instance, by a set vertical distance 51 above a horizontal geometric datum plane defined by a primary datum surface 52, which is an upper surface on the base component 300.

Alignment fixture 100 locates on the horizontal datum through use of two shoe retainers 13. The resting plane created by shoe retainers 13 is precisely positioned to the horizontal distance to the connector pin 12 (i.e. the primary datum). The alignment fixture clamps onto the component by use of shoe retainer flange clamps 13. The shoe retainer flange clamps are able to traverse in the vertical plane by use of a clamping assembly 14. The clamping assembly permits loading of the alignment fixture onto the component and allows the alignment fixture to be secured in place, establishing the primary datum.

The second datum, secondary datum 60, pertains to the lateral horizontal position of connector element 22 relative to the vertical plane of longitudinal axis a. Secondary datum 60 concerns the lateral symmetry of connector element 22. The secondary datum is established by centering connector element 22 about two lateral features on base component 300 on opposite sides of the vertical axial-longitudinal geometric plane a, such as two opposite side surfaces 32 of base component 300.

Once the primary datum has been established, the alignment fixture establishes the secondary datum by use of four dial indicators and four adjustment thumbscrews. Aft dial indicator 16a is associated with aft thumbscrew 15a; aft dial indicator 16b is associated with aft thumbscrew 15b; forward dial indicator 18a is associated with forward thumbscrew 17a; forward dial indicator 18b is associated with forward thumbscrew 17b. Aft thumbscrews 15a and 15b are axially aligned; that is, aft thumbscrews 15a and 15b share, and are each adjustable along, the same geometric longitudinal axis t. Similarly, forward thumbscrews 17a and 17b are axially aligned; that is, forward thumbscrews 17a and 17b share, and are each adjustable along, the same geometric longitudinal axis t. Each longitudinal axis t is perpendicular to vertical axial-longitudinal plane a.

Thumbscrews 15a, 15b, 17a, and 17b are each adjustable in terms of bidirectional displacement along its axial-longitudinal axis t. The aft thumbscrews 15 are adjusted until the aft dial indicators 16 read the same value. Then the forward thumbscrews 17 are adjusted until the forward dial indicators 18 read the same value. At that point, the alignment fixture is centered about the component, and the connector pin 12 is properly positioned with respect to the component mating features.

Figure 5:
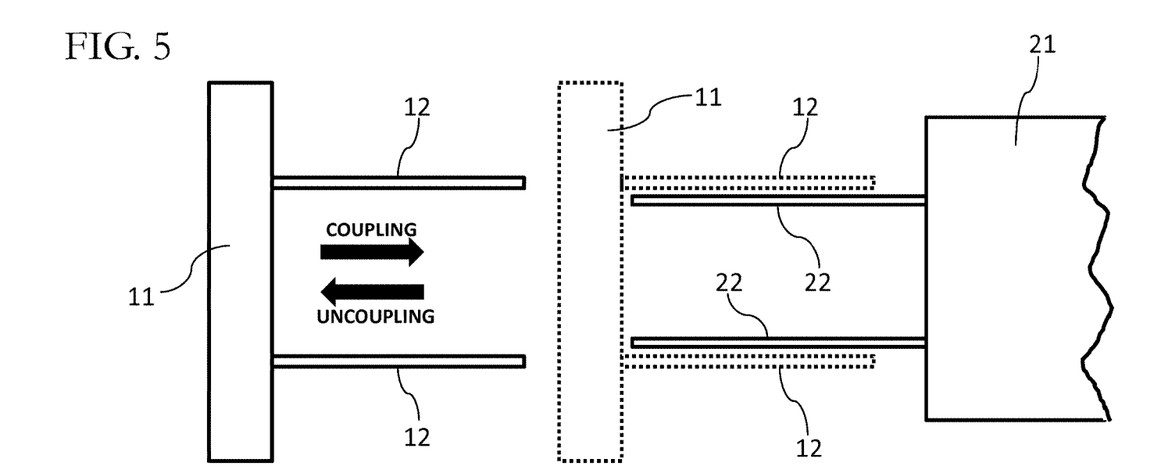
FIGS. 5 and 6 are schematics that exemplify coupling and uncoupling of an inventive alignment fixture's aligner element with respect to a connector element being inventively aligned. In each figure, the aligner element and the connector element can transform between an uncoupled condition and a coupled condition.

As shown in FIG. 5, side surfaces 32 are parallel to and on opposite sides of axial-longitudinal plane a. Thumbscrews 15 and 17 are used, in conjunction with dial indicators 16 and 18, respectively, to obtain an optimally aligned position of alignment fixture 100 with respect to base component 300. Dial indicators 16a, 16b, 18a, and 18b measure displacement of thumbscrews 15a, 15b, 17a, and 17b, respectively. The four thumbscrews 15 and 17 are manually tightened, with their corresponding thumbscrew tips 57 contacting the two opposite side surfaces 32 of base component 300, to attain equal dial indicator 16 readings of the two aft thumbscrews 15a and 15b, and equal dial indicator 18 readings of the two forward thumbscrews 17a and 17b.

According to some inventive embodiments, the primary datum is not considered; that is, only the secondary datum is considered. According to inventive practice applying a secondary datum only, the inventive fixture controls the horizontal side-to-side position only. The vertical position of the connector element is assumed to be properly located from the original construction.

Figure 6:
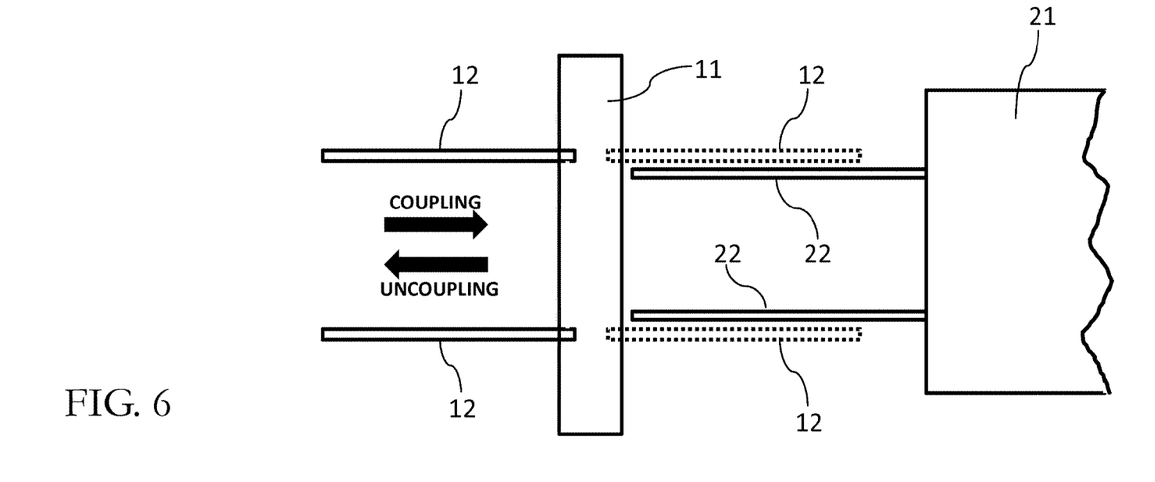

According to alternative modes of inventive practice, aligner element 12 can be either stationary with respect to frame 11 (such as shown in FIG. 5), or moveable with respect to frame 11 (such as shown in FIG. 6).

As shown in FIG. 5, the entire alignment fixture 100 is moved in the a-axial direction in order for aligner element 12 to engage or disengage with respect to connector element 22. The connector element is synonymously referred to herein as the "alignee" element. An aligner element 12 such as shown in FIG. 5 is fixed in place in relation to frame 11. Frame 11, along with aligner element 12 affixed thereto, is moved until aligner element 12 captures (fully or substantially envelops) connector element 22.

As shown in FIG. 6, the frame 11 of alignment fixture 100 remains in place, and the aligner element 12 is moved in the a-axial direction in order for aligner element 12 to engage or disengage with respect to connector element 22. Alignment fixture 100 shown in FIG. 6 is constructed so that aligner element 12 is slideable (e.g., "telescopable") in the a-axial direction. Aligner element 12 is capable of moving in the axial-longitudinal plane through implementation of a sliding-envelope assembly (e.g., sliding connector pin assembly) 19. Aligner element 12 is slid forward from a stationary frame 11 until it fully or substantially circumscribes connector element 22. In this manner, aligner element 12 protrudes to couple with connector element 22, and recedes to uncouple from connector element 22. Aligner element 12 should be in a retracted position until such time that aligner element 12 is moved to encompass connector element 22, whereupon alignment operation including adjustment of dial indicators 16 and 18 may be performed.

In either capturing mode of inventive practice, alignment operation is conducted when element 12 and connector element 22 are mated. After connector element 22 is aligned, connector unit housing 21 is tightened to specification on component 300. Connector element 22 is thus properly positioned on component 300, and inventive alignment fixture 100 may be removed.

Depending on the inventive embodiment, the connector alignment element 12 (also referred to herein as the "aligner" element 12) may or may not have an alignment slot 61 such as shown in FIG. 8, in order to properly position connector element 22 in a clocking fashion. If aligner element 22 has such an alignment assistance feature, then the mating alignment assistance feature of connector element 22 must be positioned with respect to the primary or secondary datum.

To recapitulate exemplary inventive practice as described herein, the alignment fixture is slid, from the fixture aft end towards the fixture forward end, onto the retainer flanges, until the aligner element has captured the connector element, and all four dial indicators make contact with the developed surfaces of the retainer flanges. The dial indicators should not rest on the tapered ends of the retainer flanges. The retainer flange clamps are tightened (but not over-tightened, as only a snug fit is required), securing the fixture shoes to the retainer flanges.

The aft thumbscrews are tightened on each side, adjusting each aft thumbscrew so that the final reading on the aft dial indicators is equal on each side. This reading will likely not be zero. Similarly, the forward thumbscrews are tightened on each side, adjusting each forward thumbscrew so that the final reading on the forward dial indicators is equal on each side. Again, this reading will likely not be zero. The shared aft dial indicator reading and the shared forward dial indicator reading may or may not be equal. What is important in this regard is that the aft dial indicators read the same value, and the forward dial indicators also read the same value. In exemplary inventive practice it is acceptable for the forward dial indicator pair to have a different value than the aft dial indicator pair.

The screws (e.g., 10X screws) 29 are torqued, fastening the connector housing (e.g., umbilical cover) 21 to the base component 300 according to specifications. After the connector housing is fastened to the base component, the aft and forward dial indicators should be checked to confirm equal readings of the dial indicator pairs. If the readings on either pair have deviated, the 10X umbilical cover screws 29 should be loosened, and the steps involving the adjustments of the aft and forward thumbscrews and the reading on the aft and forward dial indicators should be repeated until equal readings of dial indicator pairs are accomplished. The aligner element and the retainer flange clamps are retracted. The inventive fixture is slid toward the forward end of the base component to remove the inventive fixture from the connector unit. The inventive alignment is now complete.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for positioning a first object upon a second object, the apparatus comprising:
   a structure characterized by a geometric vertical axial plane and capable of situation upon said second object;
   four screws supported by said structure, each said screw being characterized by a geometric screw axis and being adjustably displaceable along said geometric screw axis, each said geometric screw axis being perpendicular to said geometric vertical axial plane, said screws being arranged in coaxial pairs on opposite sides of said geometric vertical axial plane;
   an alignment envelope supported by said structure, said alignment envelope being capable of holding said first object during said displacement of each of said four screws along said geometric screw axis;
   four displacement measurement devices supported with said structure, each said displacement measurement device being capable of measuring said displacement of a said screw along said geometric screw axis, said measurement of said displacement including measuring said displacement of said screw when said screw contacts said second object.

2. The apparatus for positioning as recited in claim 1, wherein said alignment envelope is capable of protracting and receding from said structure.

3. The apparatus for positioning as recited in claim 1, wherein said displacement measurement devices are calibrated for comparing said measurements of said displacements in each said coaxial pair of said four screws.

4. The apparatus for positioning as recited in claim 1, further comprising at least one fastener for fastening said first object to said second object subsequent to performance of the respective said measurements of said displacements of said four screws.

5. The apparatus for positioning as recited in claim 4, wherein said displacement measurement devices are calibrated for facilitating comparison of said measurements of said displacements in each said coaxial pair of said four screws.

6. The apparatus for positioning as recited in claim 5, further comprising a set master for calibrating said displacement measurement devices.

7. An alignment fixture comprising:
   a frame for being placed upon a base body, said frame characterized by a vertical axial geometric plane and including two longitudinal frame sections that are parallel to said vertical axial geometric plane;
   an aligner element for capturing an alignee element, said aligner element being attached to said frame and being geometrically bisected by said vertical axial geometric plane;
   two coaxial pairs of thumbscrews, each said thumbscrew having a thumbscrew tip and being bi-directionally translatable toward and away from said vertical axial geometric plane in an orientation perpendicular to said vertical axial geometric plane, wherein in each said coaxial pair of said thumbscrews a first said coaxial thumbscrew engages a first said frame section and a second said coaxial thumbscrew engages a second said frame section;

two pairs of dial indicators, each said pair of dial indicators being associated with a said coaxial pair of said thumbscrews, each said dial connector being capable of measuring an amount of said translation of one of said coaxial pair of thumbscrews while said frame is placed upon said base body, said alignee element is captured by said aligner element, and said thumbscrew tip is touching said base body.

8. The alignment fixture of claim 7, further comprising a set master for calibrating each said pair of dial indicators.

9. The alignment fixture of claim 7, wherein each said pair of dial indicators is calibrated to equate the respective said amounts of said translations of said coaxial pair of thumbscrews with which said pair of dial indicators is associated.

10. The alignment fixture of claim 7, wherein said aligner element is movable relative to said alignment fixture, said movability of said alignment element aligner facilitating said capturing of said alignee element by said aligner element.

11. The alignment fixture of claim 10, wherein said aligner element is slidable to permit said capturing of said alignee element by said aligner element while said frame is stationary.

12. The alignment fixture of claim 10, wherein said aligner element is tubular and is capable of telescoping to permit said capturing of said alignee element by said aligner element while said frame is stationary.

\* \* \* \* \*